UNITED STATES PATENT OFFICE.

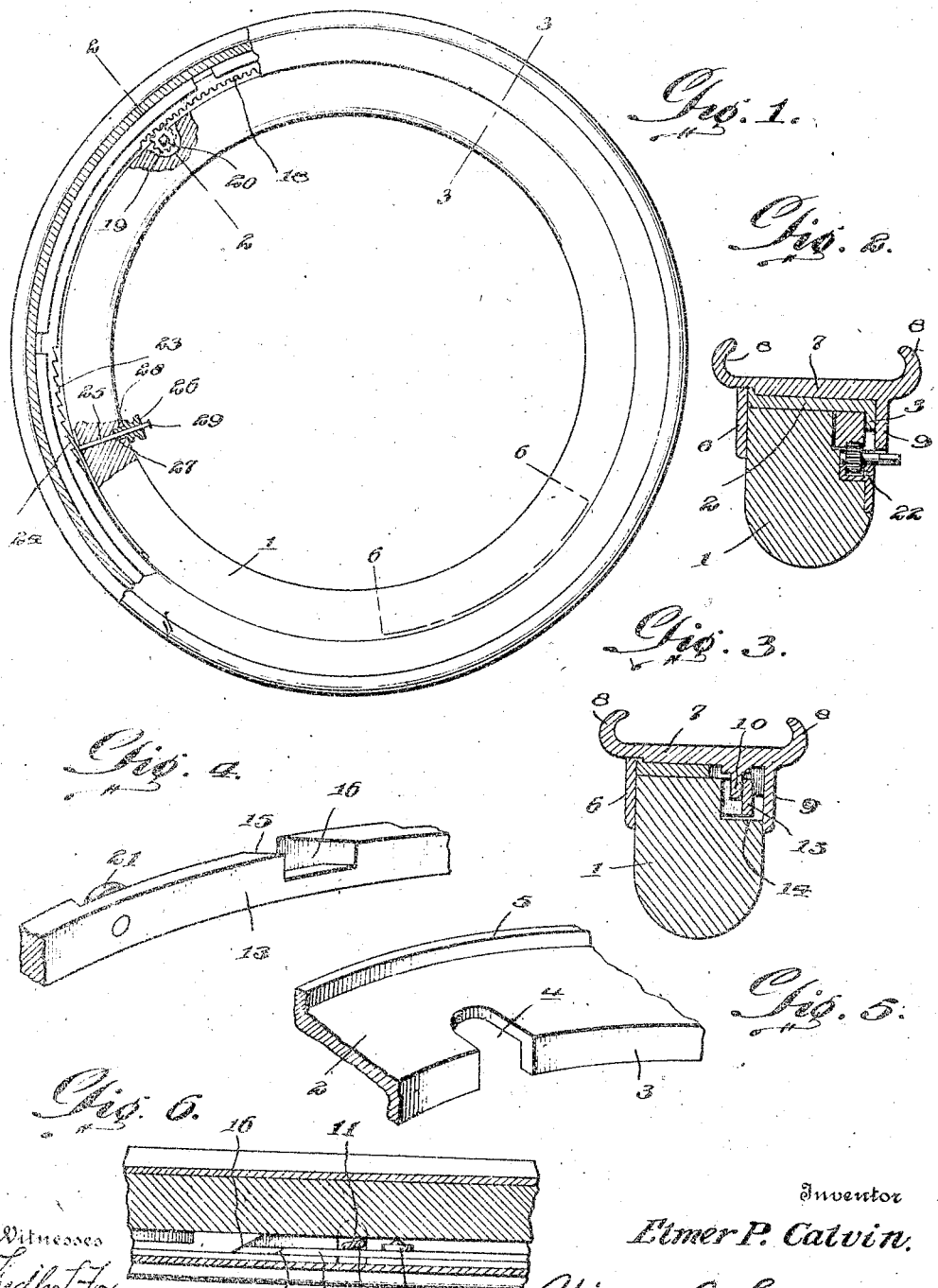

ELMER P. CALVIN, OF SARDINIA, OHIO, ASSIGNOR OF ONE-TENTH TO WALTER W. MASTERS, OF INDIANAPOLIS, INDIANA.

DEMOUNTABLE RIM.

1,183,533.

Specification of Letters Patent.

Patented May 16, 1916.

Application filed April 27, 1915. Serial No. 24,309.

*To all whom it may concern:*

Be it known that I, ELMER P. CALVIN, a citizen of the United States, residing at Sardinia, in the county of Brown and State of Ohio, have invented new and useful Improvements in Demountable Rims, of which the following is a specification.

This invention relates to vehicle wheels, the object in view being to provide, in connection with the felly of the wheel, and a fixed rim surrounding said felly, a demountable or detachable tire-carrying rim having a novel relation to the fixed rim, combined with means of novel construction and arrangement for locking the detachable rim on the fixed rim, the locking means being of such a nature as to enable the detachable rim to be wedged into place on the fixed rim and to be wedged out of place thereon, thereby greatly facilitating the mounting and demounting of the detachable rim.

One of the chief objects of this invention is to provide a demountable rim so combined with the wheel and the fixed rim thereof that the said demountable rim may be detached from the wheel and replaced thereon in a very short space of time as compared with the demountable rims now in use which require on the average about ten minutes to remove and as many minutes to replace, whereas under the present invention, a demountable rim may be removed in less than a minute and replaced just as quickly.

With the above and other objects in view, the invention consists of the novel features of construction, combination and arrangement of parts hereinafter described and claimed, reference being had to the accompanying drawings, in which:

Figure 1 is a side elevation, partly in section, showing a wheel felly, the relation of the fixed and detachable rims thereto, the locking ring and the operating means for the latter; Fig. 2 is a cross section on the line 2—2 of Fig. 1; Fig. 3 is a cross section on the line 3—3 of Fig. 1; Fig. 4 is a fragmentary perspective view of the locking ring; Fig. 5 is a fragmentary perspective view of the fixed rim; Fig. 6 is a longitudinal or circumferential section on the line 6—6 of Fig. 1.

Referring to the drawings, 1 designates a wheel felly and 2 a fixed rim composed of metal, surrounding the felly 1 and securely fastened thereto. The fixed rim 2 is provided along one of its marginal edges with an inwardly extending flange 3 formed at intervals with open notches 4 which also extend into the body portion of the rim 2 as shown in Fig. 5. Along its opposite edge the rim 2 is provided with an outwardly extending annular flange 5, against which the detachable rim is positioned when in place, as will hereinafter appear.

6 designates a flange or ring secured to the opposite side of the felly, against which the flange 5 abuts, as shown in Figs. 2 and 3.

The tire-carrying rim indicated at 7 is shown as provided with the usual pair of clencher flanges 8 and also provided at one side with an inwardly extending annular flange 9 which conceals the locking mechanism to be hereinafter described. The rim 7 is also provided at suitable intervals with inwardly extending lugs 10 having, as shown in Fig. 6, oppositely inclined wedging faces 11 and 12 which coöperate with a locking ring 13 arranged in a rabbet or recess 14 in the felly 1, said ring being adapted to be turned for a limited distance in opposite directions and being provided with wedging faces 15 and other wedging faces 16, the wedging faces 15 being formed at the extremities of circumferentially elongated tongues 17 which serve to close the slots or notches 4 to prevent the lugs 10 from escaping therefrom. There are as many wedging faces 15 and 16 as there are lugs 10 and notches 4 in order that all of the lugs 10 may be simultaneously engaged and securely held in a fixed position.

The means for partially turning the locking ring 13 embodies a rack face 18 on the ring 13 and in conjunction therewith a pinion 19 fast on a pinion shaft 20, said shaft projecting at one side of the felly 1 and beyond the flange 9 where it is squared in cross section to receive a suitable key, by means of which the shaft and pinion may be turned in order to impart a corresponding turning movement to the locking or wedging ring. To facilitate the turning of the ring 13, anti-friction rollers 21 are journaled on the ring at intervals, said rollers bearing against the floor of the recess 14 in the felly 1. The pinion shaft 20 is shown in Fig. 2 as journaled in a metal bearing plate 22, thereby increasing the life and durability of the locking mechanism.

In operation the detachable rim 7 containing the tire is slipped laterally over and upon the fixed rim 2 so that the lugs 10 will enter the notches 4 and at the same time pass between the wedging faces 15 and 16 of the locking ring. Then, by means of the rack and pinion mechanism, the ring is turned to the position shown in Fig. 6, the tongues 17 then crossing the notches or slots 4 and preventing the escape of the lugs 10. To detach the rim 7, the operation just described is reversed, permitting the lugs to be moved outwardly in the notches 4 and in the movement of the ring 13 toward its releasing position, the wedging faces 16 operate against the inner sides of the lugs 10 and crowd or wedge the detachable rim laterally and partially off the fixed rim. In order to prevent any possibility of the detachable rim and the locking ring working loose, said ring 13 is provided with a ratchet face 23 which is engaged by a spring detent 24 having attached thereto a stem 25 on which is mounted a head 26 slidable on the stem 25 and having a shank 27 which is oblong in cross section and which is adapted to fit into a recess 28 of corresponding shape in the felly 1. By sliding the head 26 against a stop shoulder 29 at the inner extremity of the stem 25, the detent 24 may be moved out of engagement with the ratchet face 23 and by giving the head 26 a quarter turn, the inner end of the shank 27 rests against the inner face of the felly 1 and holds the detent 24 out of engagement with the ratchet face 23 during the operation of demounting the rim 7.

The demountable rim, together with the locking and wedging means hereinabove described is of simple, durable, and practical construction and eliminates many of the objectionable features present in many of the demountable rims in use at the present day.

Having thus described my invention, 1 claim:

1. The combination with the felly of a vehicle wheel, of a fixed rim fast thereon and formed with open lug-receiving notches in one side edge thereof, a detachable tire-carrying rim surrounding said fixed rim and having lugs on its inner face entering said notches, having their inner and outer faces both oblique and parallel, a wedging and locking ring having two sets of wedging faces to engage the opposite oblique faces of said lugs, one set acting to press the detachable rim on and the other set acting to press said rim off the fixed rim, means for limiting the movement of the demountable rim toward the inside of the wheel, and means for turning said ring.

2. The combination with a felly of a vehicle wheel, of a fixed rim fast thereon and formed with open lug-receiving notches in one side edge thereof, a detachable tire-carrying rim surrounding said fixed rim and having lugs on its inner face entering said notches, having their inner and outer faces both oblique and parallel, a wedging and locking ring having two sets of wedging faces to engage the opposite oblique faces of said lugs, one set acting to press the detachable rim on and the other set acting to press said rim off the fixed rim, means for limiting the movement of the demountable rim toward the inside of the wheel, means for turning said ring, and a manually displaceable detent to prevent said ring from accidental turning.

In testimony whereof I affix my signature in presence of two witnesses.

ELMER P. CALVIN.

Witnesses:
JAMES A. KOEHL,
BENNETT S. JONES.